(12) United States Patent
Huang et al.

(10) Patent No.: US 12,502,237 B2
(45) Date of Patent: Dec. 23, 2025

(54) CONTROL METHOD FOR LOCATION AND ORIENTATION OF SURGICAL ROBOT END, AND CONTROL METHOD FOR SURGICAL ROBOT

(71) Applicant: CHONGQING JINSHAN MEDICAL ROBOTICS CO., LTD., Chongqing (CN)

(72) Inventors: Yu Huang, Chongqing (CN); Liao Wang, Chongqing (CN)

(73) Assignee: CHONGQING JINSHAN MEDICAL ROBOTICS CO., LTD., Chongqing (CN)

( * ) Notice: Subject to any disclaimer, the term of this patent is extended or adjusted under 35 U.S.C. 154(b) by 365 days.

(21) Appl. No.: 18/035,947

(22) PCT Filed: Nov. 2, 2021

(86) PCT No.: PCT/CN2021/128053
§ 371 (c)(1),
(2) Date: May 9, 2023

(87) PCT Pub. No.: WO2022/100480
PCT Pub. Date: May 19, 2022

(65) Prior Publication Data
US 2024/0016559 A1  Jan. 18, 2024

(30) Foreign Application Priority Data

Nov. 10, 2020  (CN) .......................... 202011246738.8
Nov. 10, 2020  (CN) .......................... 202011249218.2

(51) Int. Cl.
*A61B 34/37*  (2016.01)
*A61B 34/20*  (2016.01)
(Continued)

(52) U.S. Cl.
CPC .............. *A61B 34/37* (2016.02); *G16H 40/63* (2018.01); *A61B 2034/2059* (2016.02); *A61B 2034/302* (2016.02); *A61B 2090/067* (2016.02)

(58) Field of Classification Search
CPC ............ A61B 34/37; A61B 2034/2059; A61B 2034/302; A61B 2090/067; A61B 17/34;
(Continued)

(56) References Cited

U.S. PATENT DOCUMENTS

| 2007/0013336 A1 | 1/2007 | Nowlin et al. | |
| 2011/0166706 A1* | 7/2011 | Prisco | B25J 9/1689 |
| | | | 700/254 |

(Continued)

FOREIGN PATENT DOCUMENTS

| CN | 101227870 A | 7/2008 |
| CN | 101773400 A | 7/2010 |

(Continued)

OTHER PUBLICATIONS

International Search Report for PCT/CN2021/128053 mailed Jan. 27, 2022, ISA/CN.

(Continued)

*Primary Examiner* — Abby Lin
*Assistant Examiner* — Renee LaRose
(74) *Attorney, Agent, or Firm* — Yue (Roberts) Xu; Apex Attorneys at Law, LLP

(57) ABSTRACT

A control method for the location and the orientation of a surgical robot end, and a control method for a surgical robot. The control method for the location and the orientation of a surgical robot end comprises establishing a remote center point, and dragging a surgical robot, causing an end to move above the remote center point, the remote center point being a virtual fixed point about which an end of a surgical instrument rotates when turning past a target location; con- (Continued)

necting a surgical instrument to an instrument base of the surgical robot; controlling the surgical instrument to pass the remote center point; obtaining an expected Cartesian speed of an end of the surgical instrument, calculating a target speed for each axis of the surgical robot, and controlling movement of each axis of the surgical robot according to the target speeds.

14 Claims, 6 Drawing Sheets

(51) Int. Cl.
 *A61B 34/30* (2016.01)
 *A61B 90/00* (2016.01)
 *G16H 40/63* (2018.01)
(58) Field of Classification Search
 CPC ......... A61B 34/20; A61B 34/30; A61B 34/35; G16H 40/63
 See application file for complete search history.

(56) References Cited

U.S. PATENT DOCUMENTS

| | | |
|---|---|---|
| 2014/0276952 A1 | 9/2014 | Hourtash et al. |
| 2017/0239005 A1 | 8/2017 | Cohen et al. |
| 2019/0000576 A1 | 1/2019 | Mintz et al. |
| 2021/0030509 A1* | 2/2021 | McDowall ......... G02B 27/0176 |
| 2021/0244489 A1 | 8/2021 | Lim et al. |
| 2021/0330405 A1* | 10/2021 | Gonenc ................. B25J 9/0096 |

FOREIGN PATENT DOCUMENTS

| | | |
|---|---|---|
| CN | 104440864 A | 3/2015 |
| CN | 106333715 A | 1/2017 |
| CN | 107961078 A | 4/2018 |
| CN | 108042162 A | 5/2018 |
| CN | 108056823 A | 5/2018 |
| CN | 109009443 A | 12/2018 |
| CN | 109091237 A | 12/2018 |
| CN | 109091238 A | 12/2018 |
| CN | 109771037 A | 5/2019 |
| CN | 110893118 A | 3/2020 |
| CN | 111227938 A | 6/2020 |
| CN | 111345894 A | 6/2020 |
| EP | 3730062 A1 | 10/2020 |
| EP | 3733108 A1 | 11/2020 |
| KR | 20190140818 A | 12/2019 |
| WO | 2020197422 A2 | 10/2020 |

OTHER PUBLICATIONS

The Chinese 2nd Office Action issued on Sep. 28, 2023 for CN202011246738.8.
The Partial European Search Report issued on Sep. 16, 2024 for EP21891007.3.

* cited by examiner

Establish a remote center of motion and drag the surgical robot to move the end to above the remote center of motion, wherein the remote center of motion is a virtual stationary point around which an end of a surgical instrument rotates after passing through a target position — S1

Connect the surgical instrument to an instrument holder of the surgical robot — S2

Control the surgical instrument to pass through the remote center of motion — S3

Obtain a desired Cartesian velocity of the end of the surgical instrument, calculate a target velocity of each axis of the surgical robot and control each axis of the surgical robot to move based on the target velocity — S4

FIG. 4

CONTROL METHOD FOR LOCATION AND ORIENTATION OF SURGICAL ROBOT END, AND CONTROL METHOD FOR SURGICAL ROBOT

This application is the national phase of international patent application No. PCT/CN2021/128053, titled "CONTROL METHOD FOR LOCATION AND ORIENTATION OF SURGICAL ROBOT END, AND CONTROL METHOD FOR SURGICAL ROBOT", filed on Nov. 2, 2021 which claims the priorities of the Chinese Patent Application No. 202011249218.2, titled "METHOD FOR CONTROLLING POSITION AND ORIENTATION OF END OF SURGICAL ROBOT", filed on Nov. 10, 2020 with the China National Intellectual Property Administration, and the Chinese Patent Application No. 202011246738.8, titled "METHOD FOR CONTROLLING SURGICAL ROBOT", filed on Nov. 10, 2020 with the China National Intellectual Property Administration, all of which are incorporated herein by reference in their entireties.

FIELD

The present application relates to the technical field of medical instruments, and in particular to a method for controlling a position and an orientation of an end of a surgical robot and a method for controlling a surgical robot.

BACKGROUND

With minimally invasive surgical robots, physical effort of surgeons during surgery can be reduced while achieving precision surgery, leading to minimal cut, less blood loss, lower probability of post-operative infection and faster post-operative recovery for the patient. The minimally invasive surgical robots typically use a system in a master-slave control model. That is, when the operator operates on a master hand, hand motion drives the master hand to move. Sensors at joints of the master hand can measure motion information, and the motion of the master hand is mapped to a slave hand by using a master-slave control algorithm. Joints of the slave hand passively move to drive a surgical instrument to perform corresponding motion. An end of the surgical robot is used to load the surgical instrument and the position and the orientation of the end determine the precision of the surgical operation. Conventional abdominal surgery robots of da Vinci use a dedicated parallelogram configuration with a physical remote center of motion. Conventional methods for controlling a surgical robot can only be used for controlling a surgical robot arm to translate and rotate around the physical remote center of motion, and preoperative and intraoperative adjustment of the position of the remote center of motion is performed by translation and rotation of a robot base through additional translational mechanisms and control methods, which is inconvenient to use.

Therefore, how to control the position and the orientation of the end of the surgical robot to improve surgical precision and safety, and how to provide a method for controlling a surgical robot that is applicable to achieving translation and rotation around the remote center of motion and to adjusting the position of the remote center of motion attracted attention of those skilled in the art.

SUMMARY

A first object of the present application is to provide a method for controlling a position and an orientation of an end of a surgical robot, which can precisely control the pose of the end of the surgical robot and improve the accuracy and safety of the surgery. A second object of the present application is to provide a method for controlling a surgical robot, in which the surgical robot is controlled by means of control of a master hand and a slave hand, which provides high control accuracy, convenient and precise operation. In the control of the slave hand, a universal robot and an instrument robot are used to play their own roles, achieving translation and rotation around the remote center of motion and adjustment of the position of the remote center of motion.

To achieve the above objects, a method for controlling a position and an orientation of an end of a surgical robot is provided according to the present application. The method includes:

step S1: establishing a remote center of motion and dragging the surgical robot to move the end to above the remote center of motion, where the remote center of motion is a virtual stationary point around which an end of a surgical instrument rotates after passing through a target position;

step S2: connecting the surgical instrument to an instrument holder of the surgical robot;

step S3: controlling the surgical instrument to pass through the remote center of motion; and step S4: obtaining a desired Cartesian velocity of the end of the surgical instrument, calculating a target velocity of each axis of the surgical robot and controlling each axis of the surgical robot to move based on the target velocity.

In an embodiment, the surgical robot includes a first robotic arm with at least five motion axes, a linear guidance portion connected to the first robotic arm, and a second robotic arm connected to the linear guidance portion to drive the surgical instrument to operate, where the linear guidance portion is configured to drive the instrument holder to move linearly.

In an embodiment, the step S1 includes:

forming an opening at the target position and inserting a trocar into the opening;

dragging the at least five motion axes, so that the linear guidance portion is parallel to the trocar and the instrument holder is located above the trocar; and connecting the trocar to a trocar holder and obtaining a position of the remote center of motion.

In an embodiment, the step of connecting the trocar to a trocar holder and obtaining a position of the remote center of motion includes:

obtaining an actual angle or displacement of each of the at least five motion axes by encoders provided at the at least five motion axes, and calculating the position of the remote center of motion based on the actual angles or displacements.

In an embodiment, the step of connecting the trocar to a trocar holder and obtaining a position of the remote center of motion includes:

obtaining a position of the trocar based on a position of the trocar holder, and obtaining the position of the remote center of motion based on the position of the trocar and a constant position offset of the remote center of motion from the trocar holder.

In an embodiment, the step S3 includes:

controlling, by the linear guidance portion, the surgical instrument to linearly move through the trocar, and controlling a linear movement distance of the surgical instrument based on a displacement detected by a displacement sensor arranged at the linear guidance portion.

In an embodiment, the step S4 further includes:

keeping stationary a coincidence point at which the surgical robot coincides with the remote center of motion, driving the surgical instrument to rotate with the coincidence point being a spherical center, and obtaining a first constraint angle range of drive motors of the at least five motion axes;

calculating, based on the target velocity, a second constraint angle range of the drive motors of the at least five motion axes; and obtaining, by comparison, an overlap range of the first constraint angle range and the second constraint angle range, and controlling the drive motors to move based on the overlap range.

In an embodiment, the step S4 includes:

calculating a first output joint velocity of each of six mapping axes of a surgical instrument coordinate system according to $\dot{q}=j^{-1}*v=[\dot{q}_1, \dot{q}_2, \dot{q}_3, \dot{q}_4, \dot{q}_5, \dot{q}_6]$, calculating a second output joint velocity of each of the at least five motion axes in a base coordinate system according to $\dot{Q}=J^{-1}*V=[\dot{Q}_1, \dot{Q}_2, \dot{Q}_3, \dot{Q}_4, \ldots \dot{Q}_N]$, equal to the number of the motion axes and is greater than or equal to 5;

where $j^{-1}$ represents an inverse matrix of a first Jacobi matrix corresponding to a configuration of the six mapping axes, v represents an input Cartesian velocity of the six mapping axes, and $\dot{q}$ represents a six-dimensional vector of the first output joint velocity;

$J^{-1}$ represents an inverse matrix of a second Jacobi matrix corresponding to a configuration of the at least five motion axes, $V=[v_x, v_y, v_z, \omega_x, \omega_y, \omega_z]=[0, 0, 0, \dot{q}_2, \dot{q}_1]$, and $\dot{Q}$ represents an N-dimensional vector of the second output joint velocity;

the six mapping axes include two virtual axes at the coincidence point, one linear axis corresponding to the linear guidance portion and three motion axes at an end of the second robotic arm; and $v_x$ represents a x-directional velocity at the coincidence point, $v_y$ represents a y-directional velocity at the coincidence point, $v_z$ represents a z-directional velocity at the coincidence point, $\omega_x$ represents a rotational velocity around a x-direction at the coincidence point, $\omega_y$ represents a rotational velocity around a y-direction at the coincidence point, $\omega_z$ represents a rotational velocity around a z-direction at the coincidence point, and $\dot{q}_2$ and $\dot{q}_1$ represent the first joint output velocities of the two virtual axes, respectively.

In an embodiment, after the step S4, the method further includes:

controlling the linear guidance portion to pull out the surgical instrument when a surgery is completed or aborted, detaching the trocar from the trocar holder and freeing the at least five motion axes.

Compared with the above conventional technology, with the method for controlling a position and an orientation of an end of a surgical robot according to the present application, the surgical instrument performs motion inside the patient around a virtual stationary point by establishing the remote center of motion, the position of the end of the surgical instrument can be controlled by controlling the velocity of translation and rotation of the surgical instrument around the remote center of motion, and the orientation of the end of the surgical instrument can be controlled by controlling the motion axes close to the end of the surgical instrument. After the remote center of motion is established, the surgical instrument is connected to the instrument holder of the surgical robot, and the surgical instrument is controlled to extend into the body of the patient through the remote center of motion. The desired Cartesian velocity at the end of the surgical instrument is obtained from a surgical action to be completed. The target velocity of each motion axis of the surgical robot is solved via the inverse kinematics of the desired Cartesian velocity, and then each axis of the surgical robot is controlled to move at the target velocity, thereby achieving the precise control on the position and the orientation of the end of the surgical robot, i.e. the end of the surgical instrument.

To achieve the above objects, a method for controlling a surgical robot is provided according to the present application. The method includes:

collecting a hand motion velocity of an operator at a master hand;

controlling the movement of a slave hand based on the hand motion velocity, that is, first controlling a universal robot to drive an instrument robot to enter a target object through a target position, and then linkage controlling the universal robot to move around a remote center of motion and the instrument robot to extend and retract, whereby the instrument robot performs a predetermined operation.

In an embodiment, the hand motion velocity includes a Cartesian translation velocity and a Cartesian rotation velocity.

In an embodiment, before the step of controlling the movement of a slave hand based on the hand motion velocity, the method further includes:

collecting, by a master hand controller, the hand motion velocity and performing filtering and multiplying on the hand motion velocity, and sending the hand motion velocity after the filtering and multiplying to a slave hand controller for controlling the slave hand.

In an embodiment, before the step of linkage controlling the universal robot to move around a remote center of motion and the instrument robot to extend and retract, the method further includes:

establishing the remote center of motion.

In an embodiment, the step of establishing the remote center of motion includes:

forming an opening at the target position and inserting a trocar into the opening;

dragging a trocar holder of the instrument robot to the trocar;

connecting the trocar to the trocar holder; and calculating a position of the remote center of motion.

In an embodiment, the step of calculating a position of the remote center of motion includes:

obtaining an actual angle or displacement of each of all universal motion axes by encoders provided at all the universal motion axes of the universal robot, and calculating the position of the remote center of motion.

In an embodiment, before the step of linkage controlling the universal robot to move around a remote center of motion and the instrument robot to extend and retract, the method further includes:

obtaining all instrument axis velocities of the instrument robot by mapping a desired Cartesian velocity at an end of the instrument robot via an inverse matrix of a Jacobian matrix.

In an embodiment, the instrument axis velocities include instrument physical axis velocities corresponding to physical axes and instrument virtual axis velocities corresponding to virtual axes.

In an embodiment, after the step of obtaining all instrument axis velocities of the instrument robot by mapping, the method further includes:

obtaining all universal axis velocities of the universal robot by mapping the instrument virtual axis velocities via the inverse matrix of the Jacobian matrix.

In an embodiment, after the step of controlling the instrument robot to perform a predetermined operation, the method further includes:

controlling the instrument robot to withdraw from the target object through the remote center of motion.

Compared with the above conventional technology, the method for controlling a surgical robot according to the present application includes two steps. In the first step, the hand motion velocity of the operator at the master hand is collected. In the second step, the movement of the slave hand is controlled based on the hand motion velocity collected in the first step. The second step may be further subdivided into three steps including: first controlling the universal robot to drive the instrument robot to enter the patient's body through a cut on the patient's body, then linkage controlling the universal robot to move around the remote center of motion and the instrument robot to extend and retract, whereby the instrument robot performs the surgery. In the method for controlling a surgical robot, the surgical robot is controlled by means of control of a master hand and a slave hand, where the operator performs hand operation at the master hand and the input hand motion is transformed into a specific hand motion velocity, and the slave hand performs a corresponding motion based on the hand motion velocity input to the master hand, which provides high control accuracy, convenient and precise operation, and achieves translation and rotation around the remote center of motion and adjustment of the position of the remote center of motion.

BRIEF DESCRIPTION OF THE DRAWINGS

For illustrating the technical solutions in the embodiments of the present application or in the conventional technology more clearly, drawings referred to for describing the embodiments or the conventional technology will be briefly described hereinafter. It is apparent to those skilled in the art that the drawings in the following description are only some embodiments of the present application, and other drawings may be obtained on the basis of the provided drawings without any creative efforts.

FIG. 4 shows a flowchart of a method for controlling a position and an orientation of an end of a surgical robot according to an embodiment of the present application;

Figure 1:
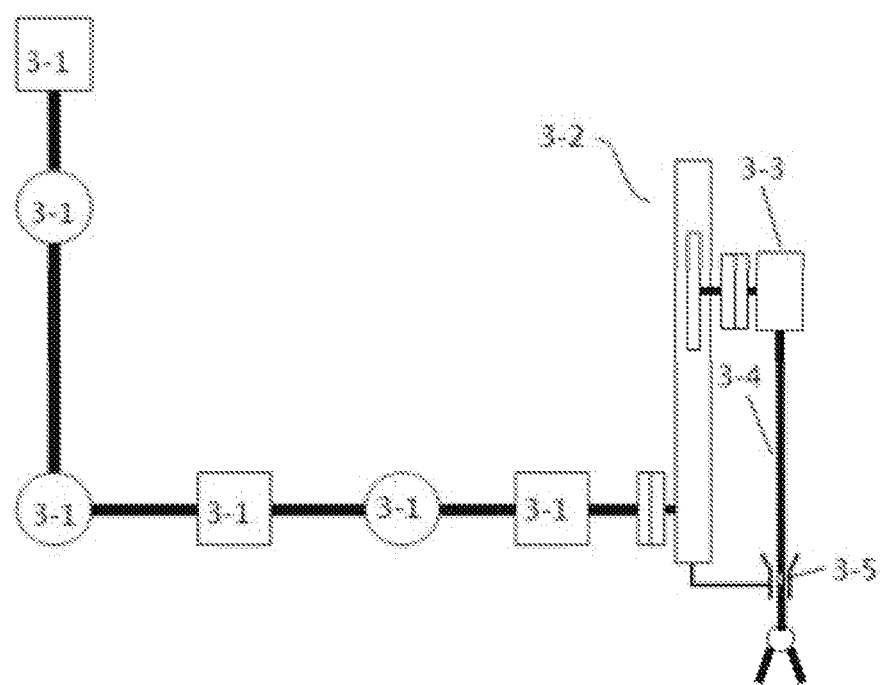
FIG. 1 shows a schematic diagram of a surgical robot according to an embodiment of the present application.

Reference numerals in FIG. 1 to FIG. 4 are listed as follows:

3-1 motion axis, 3-2 linear guidance portion, 3-3 instrument holder, 3-4 surgical instrument, 3-5 remote center of motion.

Figure 5:
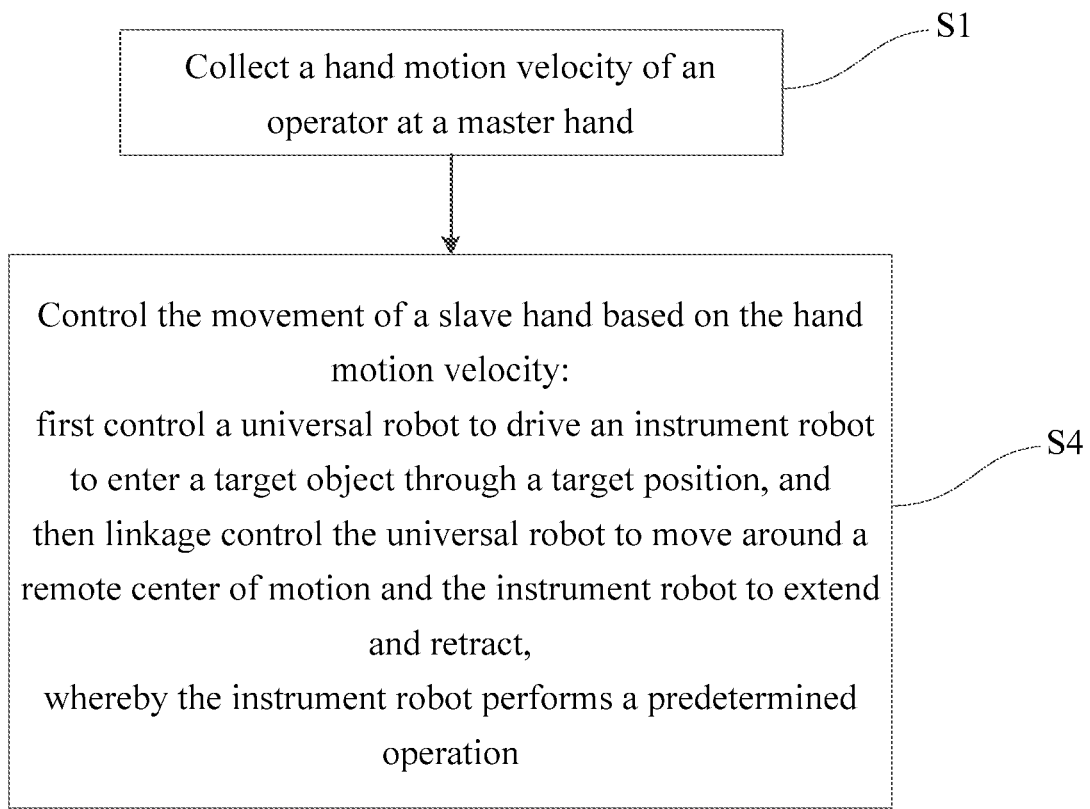
Figure 6:
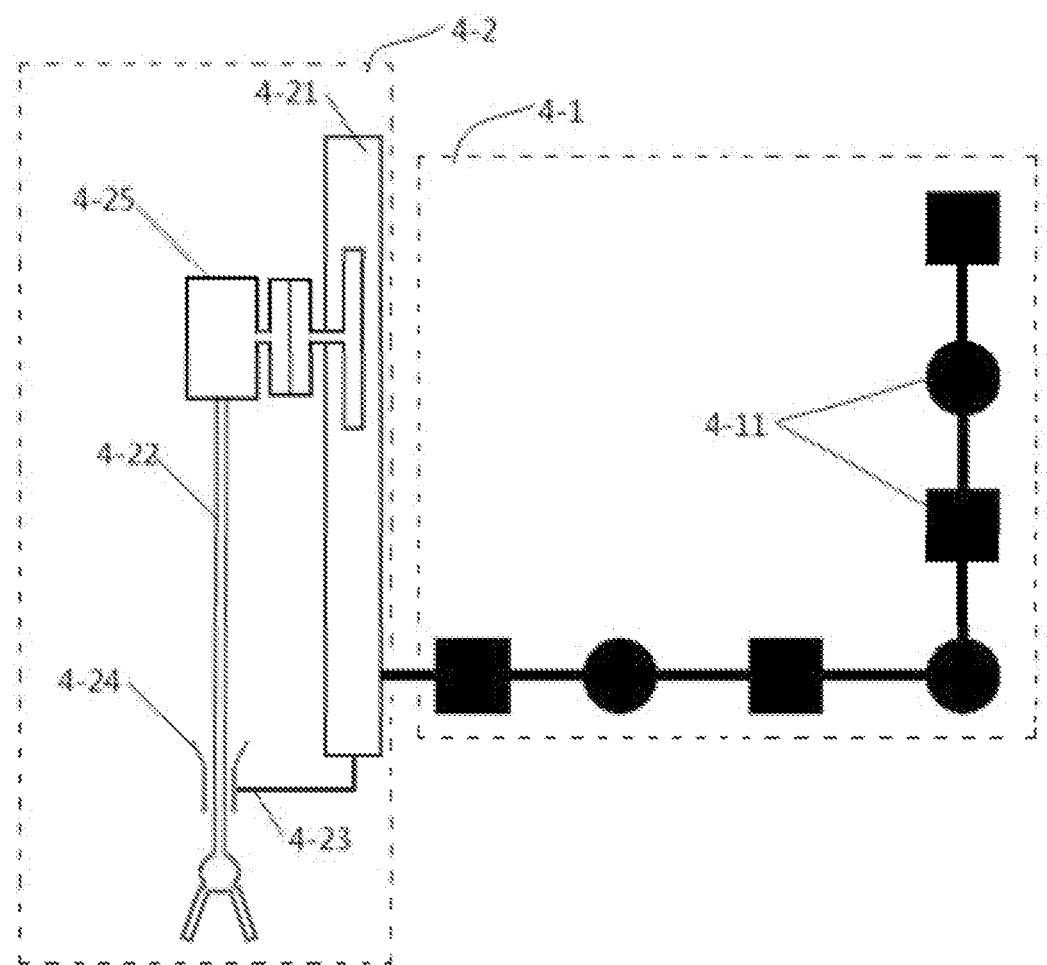
Figure 7:
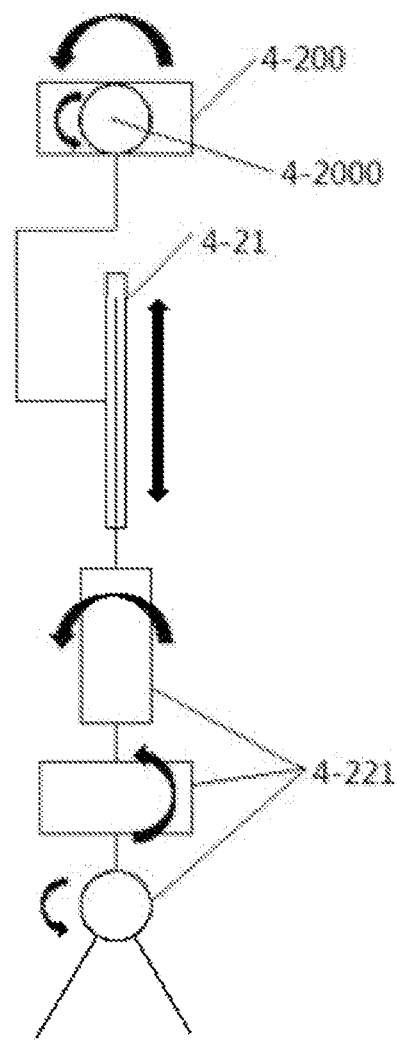

FIG. 5 shows a schematic flowchart of a method for controlling a surgical robot according to an embodiment of the present application;

FIG. 6 is a schematic structural diagram of a surgical robot according to an embodiment of the present application; and FIG. 7 is a schematic structural diagram of an instrument robot in FIG. 6.

Reference numerals in FIG. 5 to FIG. 7 are listed as follows:

4-1 universal robot, 4-2 instrument robot, 4-11 universal motion axis, 4-21 linear axis, 4-22 surgical instrument, 4-23 trocar holder, 4-24 trocar, 4-25 instrument holder, 4-200 orthogonal virtual axis, 4-221 instrument motion axis, 4-2000 remote center of motion.

DETAILED DESCRIPTION OF THE EMBODIMENTS

Technical solutions in the embodiments of the present application are clearly and completely described hereinafter in conjunction with the drawings in the embodiments of the present application. Apparently, the embodiments described in the following are only some embodiments of the present application, rather than all embodiments. Any other embodiments obtained by those skilled in the art on the basis of the embodiments of the present application without any creative work fall within the scope of protection of the present application.

In order to provide those skilled in the art with a better understanding of the technical solutions of the present application, the present application is described in further detail below in conjunction with the accompanying drawings and specific embodiments.

Minimally invasive surgery refers to a surgery in which an elongated endoscope or a tiny surgical instrument is inserted into the body of the patient through a small cut. The surgeons can observe the position of the surgical instrument and the surgical procedure while operating with the aid of a visual inspection device. Compared with the conventional open surgery, the minimally invasive surgery has the advantages of being less invasive, reducing patient pain and providing a faster recovery after surgery.

Surgical robotic systems are robotic systems capable of performing minimally invasive surgery, mainly including a master operating hand, namely master hand robot, a slave operating hand, namely slave hand robot, and a control system. The master hand robot is controlled by a surgeon to generate a pose signal, which is collected and processed to obtain a pose signal for controlling the slave hand robot. The slave hand robot in turn performs the surgical operation. The object of the present application is to provide a surgical robot (slave hand robot) that solves the problem of inconvenient movement and mutual interference of the surgical robot.

In order to provide those skilled in the art with a better understanding of the technical solutions of the present application, the present application is described in further detail below in conjunction with the accompanying drawings and specific embodiments.

Figure 2:
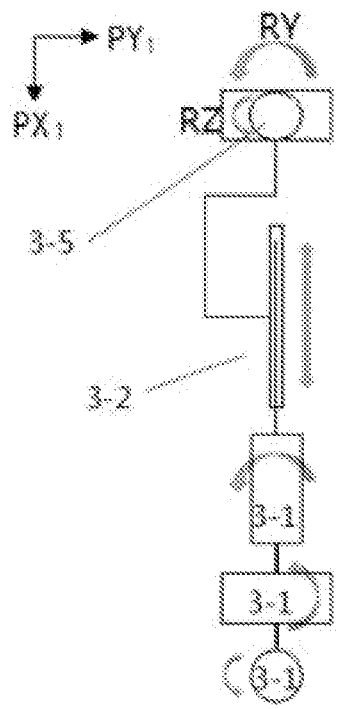
FIG. 2 shows a schematic diagram of six mapping axes in an instrument coordinate system in FIG. 2.
Figure 3:
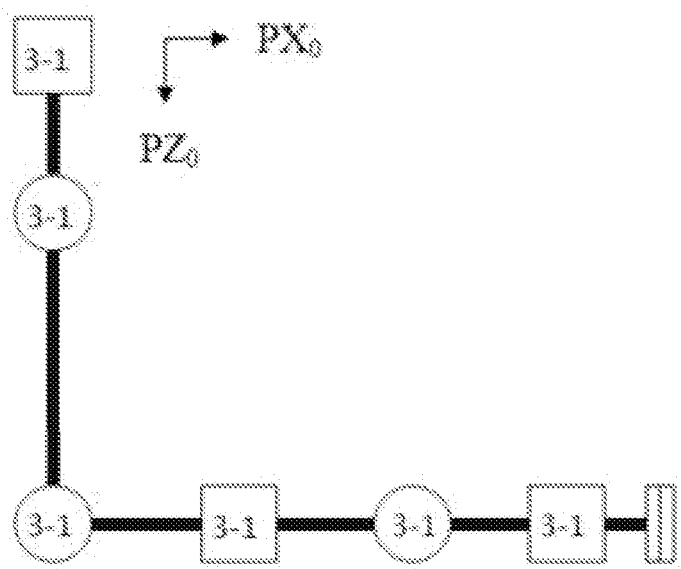
FIG. 3 shows a schematic diagram of motion axes in a base coordinate system in FIG. 2.

Referring to FIG. 1 to FIG. 4, FIG. 1 shows a schematic diagram of a surgical robot according to an embodiment of the present application, FIG. 2 shows a schematic diagram of six mapping axes in an instrument coordinate system in FIG. 1, FIG. 3 shows a schematic diagram of motion axes in a base coordinate system in FIG. 1, and FIG. 4 shows a flowchart of a method for controlling a position and an orientation of an end of a surgical robot according to an embodiment of the present application.

The method for controlling a position and an orientation of an end of a surgical robot according to the present application can be applied to a surgical robot as shown in FIG. 1 to FIG. 3. The surgical robot includes a first robotic arm and a second robotic arm. The first robotic arm is configured as a robot having at least five motion axes 3-1. A six-axis robot is illustrated in the present application as an example and referred to as a universal robot. A coordinate system established at a first motion axis 3-1 of the universal robot is referred to as a base coordinate system. A linear guidance portion 3-2 is connected to an end of the first robotic arm, the second robotic arm is capable of moving linearly along the linear guidance portion 3-2 and the second robotic arm is used to control the motion of a surgical instrument 3-4. For example, the second robotic arm includes two motors (equivalent to one degree of freedom) for controlling the opening and closing of the surgical instrument 3-4.

Two virtual axes of rotation of the surgical instrument 3-4 at a remote center of motion 3-5 generated by the motion of the first robotic arm, one linear axis of the linear guidance portion 3-2, and three motion axes 3-1 used by the second robotic arm to control the motion of the surgical instrument 3-4 are regarded as an instrument robot with six degrees of freedom, and the surgical instrument 3-4 coordinate system is a coordinate system established with the remote center of motion 3-5 being the origin. In the present application, the position and the orientation of the end of the surgical robot are controlled based on a desired Cartesian velocity in the surgical instrument 3-4 coordinate system and a second joint output velocity of the motion axes 3-1, i.e. the target velocity transformation.

The method for controlling a position and an orientation of an end of a surgical robot according to the present application includes the following four steps S1 to S4.

In step S1, a remote center of motion 3-5 is established and the surgical robot is dragged to move the end to above the remote center of motion, where the remote center of motion 3-5 is a virtual stationary point around which an end of a surgical instrument 3-4 rotates after passing through a target position.

In step S2, the surgical instrument 3-4 is connected to an instrument holder 3-3 of the surgical robot.

In step S3, the surgical instrument 3-4 is controlled to pass through the remote center of motion 3-5.

In step S4, a desired Cartesian velocity of the end of the surgical instrument 3-4 is obtained, a target velocity of each axis of the surgical robot is calculated, and each axis of the surgical robot is controlled to move based on the target velocity.

The step S1 acts to establish the remote center of motion 3-5, and determine a coincidence point at which the surgical instrument 3-4 coincides with the remote center of motion 3-5 during the surgery, i.e. coinciding with a cut on the patient's body, causing the end of the surgical instrument 3-4 to translate and rotate around the coincidence point and improving control accuracy. Specifically, a minimally invasive cut is formed on the patient's surgical site, and after the cut is formed, a laparoscope is inserted into the minimally invasive cut, and the motion axes 3-1 of the surgical robot are dragged so that the linear guidance portion 3-2 at the end of the universal robot is parallel to a trocar and the instrument holder 3-3 used to mount the surgical instrument 3-4 is located directly above the trocar.

Afterwards, the trocar is connected to a trocar holder. After detecting that the trocar is connected to the trocar holder, a sensor sends the information that the trocar and the trocar holder are connected in place to a control system of the surgical robot, and a range of motion of drive motors in all of the motion axes 3-1 is constrained by the controller.

The surgical instrument 3-4 is then mounted at the instrument holder 3-3 of the surgical robot, and the instrument holder 3-3 is fixedly connected to a linear slider of the linear guidance portion 3-2. The instrument holder 3-3 and the surgical instrument 3-4 are driven to move linearly when the linear slider moves, and the motors used to control the pitch, roll, yaw and open/close movements of the instrument can move together with the instrument holder 3-3 following the linear slider.

The specific operation for connecting the trocar to the trocar holder described above may be as follows: an actual angle or displacement of each motion axis 3-1 is measured by a corresponding encoder provided at each motion axis 3-1 when dragging each motion axis 3-1, and a dragging instrument calculates the position of the instrument holder 3-3 based on configuration parameters of the surgical robot.

When the trocar holder and the trocar are connected, the position of the remote center of motion 3-5 is calculated based on the position of the trocar holder and a constant offset distance of the trocar relative to the trocar holder. Generally, the remote center of motion 3-5 is provided at the middle of the trocar, and the position of the remote center of motion 3-5 is obtained by offsetting the position of the trocar holder the radius of the trocar and sinking it a preset depth.

In step S3, after obtaining the position of the remote center of motion 3-5, the instrument holder 3-3 and the surgical instrument 3-4 are lowered in position by means of the linear slider of the linear guidance portion 3-2 so that the surgical instrument 3-4 passes through the remote center of motion 3-5. The lowering length may be determined based on the position of the instrument holder 3-3, the distance between the instrument holder 3-3 and the trocar or the remote center of motion 3-5, the length of the surgical instrument 3-4, as well as the length of the surgical instrument 3-4 extending beyond the remote center of motion 3-5 into the body of the patient. The length of the surgical instrument 3-4 extending beyond the remote center of motion 3-5 into the body of the patient is used as the radius of rotation of the end of the surgical instrument 3-4. The point where the surgical instrument 3-4 coincides with the remote center of motion 3-5 is used as the coincidence point of the surgical instrument 3-4. The coincidence point remains stationary during the rotation of the end of the surgical instrument 3-4. The length of the surgical instrument 3-4 extending into the body of the patient varies based on the patient's surgical position, and the remote center of motion 3-5 is a virtual stationary point.

In step S4, during the surgical operation, the coincidence point is required to be kept stationary, which is achieved by rotating the six motion axes 3-1 of the six-axis robot as described above, while the end of the surgical instrument 3-4 is required to move. In this case, certain constraints are required to be applied to all the motion axes 3-1 to constrain the motion of the motion axes 3-1.

The above constraints are obtained as follows: keeping the coincidence point stationary and calculating a first constraint angle range of the drive motors for all the motion axes 3-1 based on the constraint of keeping the coincidence point stationary; then obtaining a second constraint angle range of the drive motors for all the motion axes 3-1 by inverse kinematic operations based on a surgical space range of the end of the surgical instrument 3-4 (without keeping the coincidence point stationary for this solution), and then obtaining an overlap range of the first constraint angle range and the second constraint angle range by comparison, where the above overlap range satisfies both the constraints that the coincidence point of the surgical instrument 3-4 is stationary and the end of the surgical instrument 3-4 moves at a target velocity. By inputting the overlap range to the control system, the drive motors for all the motion axes 3-1 are controlled to rotate based on the overlap range to satisfy the precise control of the position and the orientation of the end of the surgical instrument 3-4.

Specifically, the step of calculating the target velocity of each of the drive motors in the overlap range is as follows:

In a first step, an operation is performed in the surgical instrument 3-4 coordinate system.

The desired Cartesian velocity V at the end of the surgical instrument 3-4 is obtained, and the desired Cartesian velocity includes a Cartesian translation velocity and a Cartesian rotation velocity. In other words, V is a six-dimensional vector. An inverse matrix $j^{-1}$ of a Jacobi matrix corresponding to the configuration of the instrument robot, i.e. the configuration of the six mapping axes, is obtained, where j is related to structural parameters of the instrument robot. In the confirmation of relevant parameters of the instrument robot, j is known at the time of operation. The six mapping axes include two virtual axes at the coincidence point, one linear axis of the linear guidance portion 3-2 and the three motion axes 3-1 of the second robotic arm controlling the motion of the surgical instrument 3-4.

The first output joint velocity $\dot{q}$ of the six mapping axes of the surgical instrument coordinate system is calculated according to $\dot{q}=j^{-1}*v=[\dot{q}_1, \dot{q}_2, \dot{q}_3, \dot{q}_4, \dot{q}_5, \dot{q}_6]$. $\dot{q}$ represents a six-dimensional vector of the first output joint velocity. Since the surgical instrument 3-4 coordinate system is a coordinate system established with the remote center of motion 3-5 being the origin, $\dot{q}_1$ and $\dot{q}_2$ represent the first joint output velocities of the two virtual axes, respectively, and $\dot{q}_3$ represents the first joint output velocity of the linear guidance portion 3-2 or the linear axis; $\dot{q}_4$, $\dot{q}_5$, and $\dot{q}_6$ respectively represent the first joint output velocities of the three motion axes 3-1 of the second robotic arm or the instrument robot used to control the pose of the surgical instrument 3-4 in the surgical instrument coordinate system.

In a second step, operation is performed in the base coordinate system.

A second output joint velocity of each of all the motion axes 3-1 in the base coordinate system is calculated according to $\dot{Q}=J^{-1}*V=[\dot{Q}_1, \dot{Q}_2, \dot{Q}_3, \dot{Q}_4, \ldots \dot{Q}_N]$, where N is equal to the number of all the motion axes 3-1 of the first robotic arm or universal robot and is greater than or equal to 5.

$\dot{Q}$ represents an N-dimensional vector of the second output joint velocity and is an inverse matrix of a second Jacobi matrix corresponding to the configuration of all the motion axes 3-1. $J^{-1}$ is known at the time of operation when the structural parameters of the multi-axis robot are confirmed.

$V=[v_x, v_y, v_z, \omega_x, \omega_y, \omega_z]=[0, 0, 0, \dot{q}_2, \dot{q}_1]$. $v_x$ represents a x-directional velocity at the coincidence point, $v_y$ represents a y-directional velocity at the coincidence point, $v_z$ represents a z-directional velocity at the coincidence point, $\omega_x$ represents a rotation velocity around a x-direction at the coincidence point, $\omega_y$ represents a rotation velocity around a y-direction at the coincidence point, and $\omega_z$ represents a rotation velocity around a z-direction at the coincidence point, $\dot{q}_2$ and $\dot{q}_1$ represent the first joint output velocities of the two virtual axes, respectively, which are derived in the first step of the calculation. Due to the coincidence point being stationary and only the rotation of the end of the surgical instrument 3-4 occurring, $v_x$, $v_y$, $v_z$, and $\omega_x$ are all zero.

The second joint output velocity of each of the motion axes 3-1 of the first robotic arm in the base coordinate system is obtained by the above calculation, and the control system controls the rotation speed of each of the drive motors in the overlap range based on the second joint output velocity.

When a surgery is completed or otherwise aborted, the surgical instrument 3-4 is pulled out from the trocar by means of the linear guidance portion 3-2, the trocar and the trocar holder are separated from each other, and the control system frees each of the motion axes 3-1.

Referring to FIG. 5 to FIG. 7, FIG. 5 shows a schematic flowchart of a method for controlling a surgical robot according to an embodiment of the present application, FIG. 6 is a schematic structural diagram of a surgical robot according to an embodiment of the present application, and FIG. 7 is a schematic structural diagram of an instrument robot in FIG. 6.

In a specific embodiment, the method for controlling a surgical robot according to the present application includes two steps S1 to S2. In S1, a hand motion velocity of an operator at a master hand is collected; and in S2, the movement of a slave hand is controlled based on the hand motion velocity.

The surgical robot system includes a universal robot 4-1 and an instrument robot 4-2. The universal robot 4-1 may be a five-axis, six-axis, seven-axis or the like, and has a corresponding number of universal motion axes 4-11. The universal robot 4-1 has the same number of degrees of freedom as the universal motion axes 4-11. The instrument robot 4-2 includes a linear axis 4-21, and the linear axis 4-21 includes a linear guidance portion and a slider slidably connected to the linear guidance portion. A trocar holder 4-23 is arranged at the linear guidance portion, an instrument holder 4-25 is arranged at the slider, and a surgical instrument 4-22 is arranged at the instrument holder 4-25. The instrument robot 4-2 has multiple degrees of freedom of orthogonal virtual axes 4-200, the linear axis 4-21, and instrument motion axes 4-221 of the surgical instrument 4-22. The surgical instrument 4-22 is a replaceable portion that does not include the linear guidance portion and the instrument holder 4-25.

In the present embodiment, the method for controlling a surgical robot is performed by using a master hand and a slave hand, where the operator performs hand control at the master hand, and a sensor of the master hand transforms the hand motion into the hand motion velocity that is input to the controller of the master hand. In turn, the hand motion velocity collected in step S1 is inputted to the controller of the slave hand in step S2, thereby enabling control of the motion of the slave hand by the master hand.

Step S2 may further be subdivided into steps S21 to S23. In step S21, the universal robot 4-1 is controlled to drive the instrument robot 4-2 to enter a target object through a target position. In step S22, the universal robot 4-1 is linkage controlled to move around a remote center of motion 4-2000 and the instrument robot 4-2 to extend and retract; and in step S23, the instrument robot 4-2 is controlled to perform a predetermined operation.

It should be noted that the method for controlling a surgical robot in the embodiment is applicable not only to simulated surgery in the form of teaching when the target object is a mannequin, but also to real surgery when the target object is a real person. When a real surgery is performed, the above target object corresponds to the human body, the target position corresponds to the cut on the patient's body, and the predetermined operation performed by the instrument robot 4-2 is various operations performed during the real surgery. More specifically, in step S21, the universal robot 4-1 is first controlled to drive the instrument robot 4-2 to enter the body of the patient through the cut on the patient's body. In step S22, the universal robot 4-1 is linkage controlled to move around a remote center of motion 4-2000 and the instrument robot 4-2 to extend and retract; and in step S23, the instrument robot 4-2 is controlled to perform the surgery.

In the embodiment, the universal robot 4-1 is stationary only at the moment of inserting the instrument; during the surgical operation after insertion of the instrument, the universal robot 4-1 is always moving around the remote center of motion 4-2000. That is, the universal robot 4-1 moves around the remote center of motion 4-2000 when the instrument robot 4-2 moves, and the pose and trajectory of the end of the instrument are resultant motions of both the universal robot 4-1 and the instrument robot 4-2. The method for controlling a surgical robot is composed of separates controls of the universal robot 4-1 and the instrument robot 4-2, i.e. different control methods are used for different robots, achieving different motion control and different functions. Specifically, the universal robot 4-1 is connected to the instrument robot 4-2, and the universal robot 4-1 can drive the instrument robot 4-2 to move, and thus the movement of the universal robot 4-1 is controlled by means of the controller of the slave hand, so that the universal robot 4-1 drives the instrument robot 4-2 to move around the remote center of motion 4-2000, and thus the end of the instrument robot 4-2 completes the surgery in the body.

Specifically, the hand motion velocity includes a Cartesian translation velocity and a Cartesian rotation velocity.

In addition to this, before step S2, i.e. before the step of controlling the movement of the slave hand based on the hand motion velocity, the method further includes: collecting, by a master hand controller, the hand motion velocity and performing filtering and multiplying on the hand motion velocity, and sending the hand motion velocity after the filtering and multiplying to a slave hand controller for controlling the slave hand.

Before step S22, the method further includes: establishing the remote center of motion 4-2000.

Specifically, the step of establishing the remote center of motion 4-2000 includes: forming an opening at the target position and inserting a trocar 4-24 into the opening; dragging the trocar holder 4-23 of the instrument robot 4-2 to the trocar 4-24; connecting the trocar 4-24 to the trocar holder 4-23; and calculating a position of the remote center of motion 4-2000. The target position corresponds to a real surgical site at the time of real surgery.

Due to the design of the trocar holder 4-23 on the robot, the Cartesian position of the remote center of motion 4-2000 with respect to the base coordinate system may be obtained by inputting the actual angle or actual displacement of each of encoders at joints to a forward kinematic model of the robot at the moment of connecting the trocar 4-24.

When the instrument is inserted, the instrument is inserted through the linear guidance portion with a fixed spatial position and the trocar 4-24 with a fixed spatial position. The trocar 4-24 is parallel to the linear guidance portion, simplifying the operation difficulty of inserting the instrument. The position of the remote center of motion 4-2000 may be adjusted intraoperatively according to clinical needs, and if the patient's cut moves, the trocar holder 4-23 may be dragged to translate to quickly release the pressure at the trocar 4-24 to avoid secondary injury. In case of an emergency such as a power failure and it is required to quickly withdraw the instrument to continue the operation, the linear guidance portion with a fixed spatial position and the trocar 4-24 with a fixed spatial position of the present configuration allow the clinical staff to pull out the instrument in a straight line to protect the patient's cut from secondary injury.

The step of calculating the position of the remote center of motion 4-2000 specifically includes: obtaining an actual displacement or an actual angle of each of the universal motion axes 4-11 by encoders provided at all the universal motion axes 4-11 of the universal robot 4-1 and calculating the position of the remote center of motion 4-2000.

Specifically, the universal motion axes 4-11 include rotary axes and linear axes, and correspondingly, the displacement variation includes angular displacement and linear displacement, i.e. the actual angle of the feedback and the actual distance of the feedback. The actual angle corresponds to an angle encoder that obtains the displacement variation of the corresponding rotary axis in the universal motion axes 4-11, and the actual distance corresponds to a distance encoder that obtains the displacement variation of the corresponding linear axis in the universal motion axes 4-11.

In addition to this, before step S23, i.e. before the step of controlling the instrument robot 4-2 to enter the body of the patient for surgery through the remote center of motion 4-2000, the method further includes: obtaining all instrument axis velocities of the instrument robot 4-2 by mapping a desired Cartesian velocity at an end of the instrument robot 4-2 via an inverse matrix of a Jacobian matrix.

The instrument axis velocities include instrument physical axis velocities corresponding to physical axes and instrument virtual axis velocities corresponding to virtual axes, and the motion of the virtual axes includes the linked motions of axes of the universal robot 4-1 around the remote center of motion 4-2000.

Specifically, after the step of obtaining all instrument axis velocities of the instrument robot 4-2 by mapping, the method further includes: obtaining all universal axis velocities of the universal robot 4-1 by mapping the instrument virtual axis velocities via the inverse matrix of the Jacobian matrix.

In step 1, the velocity of each axis of the instrument robot 4-2 is calculated by using $\dot{q}=j^{-1}*v$, where $\dot{q}$ represents the velocity of each joint of the instrument robot 4-2 (n-dimensional vector, number of axes of the instrument robot n=6), j represents the inverse matrix of the Jacobi matrix corresponding to the configuration of the instrument robot 4-2, v represents the Cartesian velocity (6-dimensional vector) of the end of the instrument desired by the user, $v=[v_x, v_y, v_z, \omega_x, \omega_y, \omega_z]$, and given the above conditions the joint velocity of the instrument robot 4-2 $\dot{q}=j^{-1}*v=[\dot{q}_1, \dot{q}_2, \dot{q}_3, \dot{q}_4, \dot{q}_5, \dot{q}_6]$.

In step 2, the velocity of each axis of the universal robot 4-1 is calculated by using $\dot{Q}=J^{-1}*V$, where $\dot{Q}$ represents the velocity of each joint of the universal robot 4-1 (n-dimensional vector, number of axes of the universal robot n=5, 6, 7 . . . ), $J^{-1}$ represents the inverse matrix of the Jacobi matrix corresponding to the configuration of the universal robot 4-1, and V represents the target velocity (6-dimensional vector) at the remote center of motion, and V=[x velocity of the remote center of motion, y velocity of the remote center of motion, z velocity of the remote center of motion, rx velocity of the remote center of motion, ry velocity of the remote center of motion, rz velocity of the remote center of motion]=[0, 0, 0, 0, $\dot{q}_2$, $\dot{q}_1$], where $\dot{q}_2$ and $\dot{q}_1$ are calculated in the first step. Given the above conditions, the joint velocity of the universal robot 4-1 $\dot{Q}=[\dot{Q}_1, \dot{Q}_2, \dot{Q}_3, \dot{Q}_4, \dot{Q}_5 \ldots \dot{Q}_N]$.

In the present embodiment, the remote center of motion 4-2000 is established by the following process.

1. Before connecting the trocar 4-24, rotation angles of joints of the robot are unconstrained and are in a free dragging mode.

2. An opening is formed at a surgical site and the trocar 4-24 is inserted into the opening.

3. Axes are dragged to drag the trocar holder 4-23 at the bottom of the linear guidance portion to a position near the trocar 4-24.

4. The trocar 4-24 is connected to the trocar holder 4-23, and after the sensor detects that the connection is established, the control system calculates the position of the remote center of motion 4-2000 by inputting the actual angle or actual distance of each of encoders at joints into the forward kinematic model of the robot. The control system constrains the rotation angle of each joint of the robot. In this case the universal robot 4-1 can only move around the remote center of motion 4-2000 through which the trocar 4-24 passes, but the instrument is not controlled to pass through the remote center of motion 4-2000.

5. The surgical instrument 4-22 is connected to the instrument holder 4-25, and the linear guidance portion controls the instrument to pass through the remote center of motion 4-2000 to extend into the body.

6. Implementing the control method: obtaining six axis velocities of the instrument robot 4-2 by mapping the desired Cartesian velocity at the end of the instrument robot via the inverse matrix of the Jacobian matrix. In this case the target velocities of the four motors and the target velocities of the orthogonal virtual axes 4-200, i.e. the two virtual axes, may be obtained. The target velocities of the orthogonal virtual axes 4-200 are then mapped to the individual physical axis velocities of the universal robot 4-1 via the inverse matrix of the Jacobian matrix. In this case the target velocity control commands of all motors are obtained.

Ultimately, after step S23, the method further includes: controlling the instrument robot 4-2 to withdraw from the target object again through the remote center of motion 4-2000. In the case of real surgery, the target object corresponds to the patient's body, and step S23 specifically involves controlling the instrument robot 4-2 withdraw from the patient's body again through the remote center of motion 4-2000.

In the embodiment, the remote center of motion 4-2000 is terminated in the following process.

1. The instrument is withdrawn (pulled out) linearly along the linear guidance portion.

2. The trocar holder 4-23 and the trocar 4-24 are separated from each other.

3. The joints of the robot are dragged freely to a vacant area.

The surgical robotic system actually includes two separate robots at the level of the control algorithm, each with its own control target. One robot controls the position and orientation of the end of the instrument in the human body and the other controls the linear guidance portion to move around the remote center of motion 4-2000. Two separate and independent controllers or one controller may be provided, and both shall fall within the scope of description of the embodiment. The end of the universal robot 4-1 does not move following the extension and retraction of the instrument. The controller of the universal robot 4-1 in the configuration is not responsible for controlling the position and orientation of the end of the surgical instrument 4-22, but only for controlling the movement of the linear guidance portion around the remote center of motion 4-2000. The control of the position and the orientation of the end of the surgical instrument 4-22 is included in a control model of the instrument robot 4-2.

In this specification, it should be noted that, relational terms such as first and second are merely used to distinguish an entity from other entities and do not require or imply that there are any such actual relationships or sequences between these entities.

The surgical robot, the surgical robot system, the method for controlling a position and an orientation of an end of a surgical robot and the method for controlling a surgical robot according to the present application have been described in detail above. The principle and the embodiments of the present application are illustrated herein through specific examples. The description of the above embodiments is merely used to facilitate understanding the method and core idea of the present application. It should be noted that for those skilled in the art, various improvements and modifications can be made to the present application without departing from the principle of the present application, and these modifications and improvements are also deemed to fall into the scope of protection of the present application defined by the appended claims.

The invention claimed is:

1. A method for controlling a position and an orientation of an end of a surgical instrument of a surgical robot, wherein the surgical robot comprises a first robotic arm with at least five motion axes, a linear guidance portion connected to the first robotic arm, and a second robotic arm connected to the linear guidance portion to drive the surgical instrument to operate, wherein the linear guidance portion is configured to drive an instrument holder of the surgical robot to move linearly, the method comprising:
   obtaining a desired Cartesian velocity of the end of the surgical instrument, calculating a target velocity of each axis of the surgical robot and controlling each axis of the surgical robot to move based on the target velocity,
   wherein the calculating a target velocity of each axis of the surgical robot comprises:
   calculating a first output joint velocity of each of six mapping axes of a surgical instrument coordinate system by mapping the desired Cartesian velocity of the end of the surgical instrument via an inverse matrix of a first Jacobian matrix, wherein the six mapping axes comprises two virtual axes at a coincidence point of a remote center of motion, one linear axis corresponding to the linear guidance portion and three motion axes of the second robotic arm, wherein the remote center of motion is a virtual stationary point around which the end of the surgical instrument rotates after passing through a target position; and
   calculating a second output joint velocity of each of the at least five motion axes in a base coordinate system by mapping the first output joint velocities of the two virtual axes via an inverse matrix of a second Jacobian matrix.

2. The method for controlling a position and an orientation of an end of a surgical instrument of a surgical robot according to claim 1, wherein the method further comprises:
   forming an opening at the target position and inserting a trocar into the opening;

dragging the at least five motion axes, so that the linear guidance portion is parallel to the trocar and the instrument holder is located above the trocar; and connecting the trocar to a trocar holder and obtaining a position of the remote center of motion.

3. The method for controlling a position and an orientation of an end of a surgical instrument of a surgical robot according to claim 2, wherein the step of connecting the trocar to a trocar holder and obtaining a position of the remote center of motion comprises:

obtaining an actual angle or displacement of each of the at least five motion axes by encoders provided at the at least five motion axes, and calculating the position of the remote center of motion based on the actual angles or displacements; or obtaining a position of the trocar based on a position of the trocar holder, and obtaining the position of the remote center of motion based on the position of the trocar and a constant position offset of the remote center of motion from the trocar holder.

4. The method for controlling a position and an orientation of an end of a surgical instrument of a surgical robot according to claim 3, wherein the method further comprises:

controlling, by the linear guidance portion, the surgical instrument to linearly move through the trocar, and controlling a linear movement distance of the surgical instrument based on a displacement detected by a displacement sensor arranged at the linear guidance portion.

5. The method for controlling a position and an orientation of an end of a surgical instrument of a surgical robot according to claim 4, wherein the method further comprises:

keeping stationary a coincidence point at which the surgical robot coincides with the remote center of motion, driving the surgical instrument to rotate with the coincidence point being a spherical center, and obtaining a first constraint angle range of drive motors of the at least five motion axes;

calculating, based on the target velocity, a second constraint angle range of the drive motors of the at least five motion axes; and obtaining, by comparison, an overlap range of the first constraint angle range and the second constraint angle range, and controlling the drive motors to move based on the overlap range.

6. The method for controlling a position and an orientation of an end of a surgical instrument of a surgical robot according to claim 5, wherein:

the calculating a first output joint velocity of each of six mapping axes of a surgical instrument coordinate system comprises calculating the first output joint velocity of each of the six mapping axes of the surgical instrument coordinate system according to $\dot{q}=j^{-1}*v=[\dot{q}_1, \dot{q}_2, \dot{q}_3, \dot{q}_4, \dot{q}_5, \dot{q}_6]$;

the calculating a second output joint velocity of each of the at least five motion axes in a base coordinate system comprises calculating the second output joint velocity of each of the at least five motion axes in the base coordinate system according to $\dot{Q}=J^{-1}*V=[\dot{Q}_1, \dot{Q}_2, \dot{Q}_3, \dot{Q}_4, \ldots \dot{Q}_N]$, wherein N is equal to the number of the motion axes and is greater than or equal to 5;

wherein $j^{-1}$ represents the inverse matrix of the first Jacobi matrix corresponding to a configuration of the six mapping axes, v represents an input Cartesian velocity of the six mapping axes, and $\dot{q}$ represents a six-dimensional vector of the first output joint velocity;

$J^{-1}$ represents the inverse matrix of the second Jacobi matrix corresponding to a configuration of the at least five motion axes, $V=[v_x, v_y, v_z, \omega_x, \omega_y, \omega_z]=[0, 0, 0, 0, \dot{q}_2, \dot{q}_1]$, and $\dot{Q}$ represents an N-dimensional vector of the second output joint velocity;

and $v_x$ represents a x-directional velocity at the coincidence point, $v_y$ represents a y-directional velocity at the coincidence point, $v_z$ represents a z-directional velocity at the coincidence point, $\omega_x$ represents a rotational velocity around a x-direction at the coincidence point, $\omega_y$ represents a rotational velocity around a y-direction at the coincidence point, $\omega_z$ represents a rotational velocity around a z-direction at the coincidence point, and $\dot{q}_2$ and $\dot{q}_1$ represent the first joint output velocities of the two virtual axes, respectively.

7. The method for controlling a position and an orientation of an end of a surgical instrument of a surgical robot according to claim 6, wherein the method further comprises:

controlling the linear guidance portion to pull out the surgical instrument when a surgery is completed or aborted, detaching the trocar from the trocar holder and freeing the at least five motion axes.

8. A method for controlling a surgical robot, comprising:

collecting a hand motion velocity of an operator at a master hand;

controlling the movement of a slave hand based on the hand motion velocity, that is, first controlling a universal robot to drive an instrument robot to enter a target object through a target position, and then linkage controlling the universal robot to move around a remote center of motion and the instrument robot to extend and retract, whereby the instrument robot performs a predetermined operation, wherein before the step of linkage controlling the universal robot to move around a remote center of motion and the instrument robot to extend and retract, the method further comprises:

obtaining instrument axis velocities of the instrument robot by mapping a desired Cartesian velocity at an end of the instrument robot via an inverse matrix of a Jacobian matrix, wherein the instrument axis velocities comprise instrument physical axis velocities corresponding to physical axes and instrument virtual axis velocities corresponding to virtual axes, after the step of obtaining instrument axis velocities of the instrument robot by mapping, the method further comprises:

obtaining universal axis velocities of the universal robot by mapping the instrument virtual axis velocities via the inverse matrix of the Jacobian matrix.

9. The method for controlling a surgical robot according to claim 8, wherein the hand motion velocity comprises a Cartesian translation velocity and a Cartesian rotation velocity.

10. The method for controlling a surgical robot according to claim 8, wherein before the step of controlling the movement of a slave hand based on the hand motion velocity, the method further comprises:

collecting, by a master hand controller, the hand motion velocity and performing filtering and multiplying on the hand motion velocity, and sending the hand motion velocity after the filtering and multiplying to a slave hand controller for controlling the slave hand.

11. The method for controlling a surgical robot according to claim 8, wherein before the step of linkage controlling the universal robot to move around a remote center of motion and the instrument robot to extend and retract, the method further comprises:
   establishing the remote center of motion.

12. The method for controlling a surgical robot according to claim 11, wherein
   the step of establishing the remote center of motion comprises:
   forming an opening at the target position and inserting a trocar into the opening;
   dragging a trocar holder of the instrument robot to the trocar;
   connecting the trocar to the trocar holder; and
   calculating a position of the remote center of motion.

13. The method for controlling a surgical robot according to claim 12, wherein the step of calculating a position of the remote center of motion comprises:
   obtaining an actual angle or displacement of each of all universal motion axes by encoders provided at all the universal motion axes of the universal robot, and calculating the position of the remote center of motion.

14. The method for controlling a surgical robot according to claim 8, wherein after the step of controlling the instrument robot to perform a predetermined operation, the method further comprises:
   controlling the instrument robot to withdraw from the target object through the remote center of motion.

\* \* \* \* \*